J. C. HENDERSON.
BOX FOR TREATING METALLIC ARTICLES BY HEAT.
APPLICATION FILED JULY 8, 1916.
1,270,519.   Patented June 25, 1918.
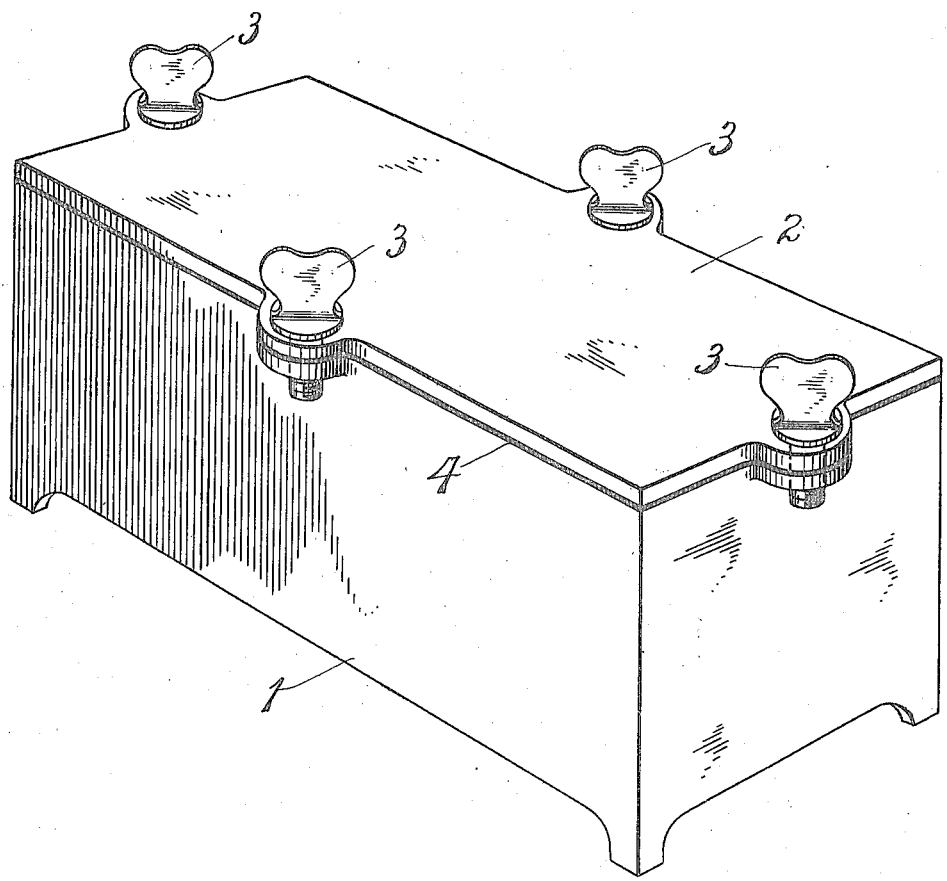

UNITED STATES PATENT OFFICE.

JOHN C. HENDERSON, OF WASHINGTON, DISTRICT OF COLUMBIA, ASSIGNOR TO DRIVER-HARRIS COMPANY, OF HARRISON, NEW JERSEY, A CORPORATION OF NEW JERSEY.

BOX FOR TREATING METALLIC ARTICLES BY HEAT.

1,270,519.   Specification of Letters Patent.   Patented June 25, 1918.

Application filed July 8, 1916. Serial No. 108,101.

*To all whom it may concern:*

Be it known that I, JOHN C. HENDERSON, a citizen of the United States, residing at Washington, in the District of Columbia, have invented certain new and useful Improvements in Boxes for Treating Metallic Articles by Heat, of which the following is a full, clear, and exact description.

My invention relates to an improvement in closed containers such as malleableizing, annealing and hardening boxes for treating metallic articles by heat at a high temperature and has for its object to provide a container having a box portion which shall be capable of resisting the action of temperatures as high as that required for carbonizing without having its shape materially changed or warped. It further has for its object to produce a container in which hardening gases can be very largely retained during the heat treatment of articles therein.

At present containers used as malleableizing, annealing and case-hardening boxes are largely made of two kinds of material, cast iron and cast steel. The grade of iron used is ordinary iron and the steel used is of a very low grade, both costing but a few cents a pound. Neither of these materials is at all satisfactory, the cast iron boxes not only scaling to a destructive extent but often being ruined through cracking after four or five eight-hour heats of 1700° F., which cracking permits excessive heat to enter and ruin expensive contents. Steel boxes are less liable to crack but scale destructively so that twenty-five to thirty heats is considered a long life for them. In addition to these defects both cast iron and cast steel boxes warp so as to bulge and change their shapes to an extent which considerably reduces the number of boxes that may be placed upon a furnace floor. These boxes oftentimes also collapse so that the internal dimensions are reduced. On account of the change in the shape of boxes made of materials now employed due to their expansion and warping the covers of case-hardening boxes are very loosely fitted, a large amount of clay being required to fill the open space between the cover and the edge of the box, on account of which and on account of the warping of the boxes and their covers, the gases therein are not substantially confined during the heat treatment. Furthermore, on account of the scaling of the present boxes the thickness of their walls is reduced by use so that the box constantly grows thinner in use and the depth of the case-hardening of the articles within it varies accordingly on account of the varying amount of heat which reaches them so that the product lacks uniformity. Furthermore, the boxes now used when new are thick and heavy and for this reason the labor of handling them is greater than it would be with the lighter boxes. In boxes made according to my invention these objections do not exist and the doing away with these objections are objects of my invention. A further object of my invention is to produce a box which can be safely quenched or cooled with water without destroying the same. A further object is to reduce the labor and expense of using hardening boxes.

The following is a description of my invention, reference being had to the accompanying drawing which shows in perspective a box embodying my improvement.

Referring more particularly to the drawing, 1 is a box composed of an alloy hereinafter specified. 2 is a tight fitting cover composed of similar material and 3 are fastening devices also composed of similar material. The opposing faces of the box and the cover are machined so as to afford parallel opposing surfaces making a tight fit so as to largely confine within the box gases which may be generated therein. I secure the cover firmly to the box by suitable means such as coarse threaded screws 3. The cover, properly made and secured, largely prevents the escape of gases and confines the gases for a considerable period which results in accelerating the hardening action. I may use a seal 4 of clay or asbestos but the seal may be reduced or in some instances is unnecessary so that by my invention I do away with the expense of material and loss of time that the use of the old seal or clay would result in.

In carrying out my invention I form the box of an alloy containing from 5 to 30% of chromium and nickel (or cobalt) to an amount of preferably from 50 to 90%, the combined nickel (or cobalt) and chromium being preferably at least 60% and a cover preferably of the same material. The following is the preferred composition of the alloy used in carrying out my invention, viz., nickel sixty per cent. (60%) chromium twelve per cent. (12%) iron twenty-six per cent. (26%) and manganese one and one-half per cent. (1½%). When the parts of the container are to be machined the alloy if containing iron should be substantially carbon free, the carbon not exceeding four-tenths per cent. (.4%). Iron, nickel and cobalt are classified as belonging to the same group of metals in Mendeleeff's table and have approximately the same atomic weights, to wit, iron 58.65, nickel 58.68 and cobalt 58.97, and cobalt may be substituted for nickel in the alloy used for carrying out my invention in its preferred form since it has substantially the same properties as nickel.

In forming boxes such as above shown in accordance with all the features of my invention I first cast the box and cover and machine the opposing faces of the same, so that they will fit tightly. I then provide a suitable securing means such as massive screws 3 made of similar material, openings being provided in the cover and tapped holes being provided in the box body for the reception of such screws when the fastening devices are in screw form. The box body and cover are substantially non-warping at either a malleableizing, annealing or carbonizing temperature and are not materially affected by the required heat treatment so that they can be used repeatedly. On account of the non-warping the boxes do not change in shape so as to be reduced in internal dimensions or take up too much space within the furnace. The alloy requires a high melting heat but when sufficiently melted can be cast in the ordinary manner to form the boxes and covers therefor. In the preferred form of boxes embodying my invention the walls are preferably made as thin as casting practice will permit. For a box eight inches by ten inches and five inches deep I preferably make the walls about five-sixteenths of an inch thick. For large boxes a thickness of one-half inch is sufficient.

In carrying out a hardening process with the boxes above described I first place the articles to be hardened within the refractory non-warping box, together with the ordinary materials used in case-hardening. I then place the cover thereon, sealing the same with clay or the like or securing it by the fastening means, or both sealing and securing it, and expose the box with its contents to a proper heat for a period of time sufficient to produce the desired effect. While exposed to this heat carbonizing gases are generated within the box which are largely retained therein. Heat of carbonizing temperature does not substantially injure the box so that it can be repeatedly charged and heated without substantial deterioration. Good results are attained if iron is omitted from the alloy. When it is desired to cool the box quickly I either pour water upon it or immerse it in water which can be done without danger of its cracking.

As will be evident to those skilled in the art, my invention permits of various modifications without departing from the spirit thereof or the scope of the appended claims.

What I claim is:

1. A closed container for use in heat treatment consisting of a non-warping heat-resisting metallic box composed of an alloy containing chromium and a metal classified with iron in Mendeleeff's table and of substantially the same atomic weight as iron, and a cover for said box.

2. A closed container for use in heat treatment consisting of a non-warping heat-resisting metallic box composed of an alloy containing from five to thirty per cent. of chromium and a metal classified with iron in Mendeleeff's table and of substantially the same atomic weight as iron, and a cover of similar material for said box.

3. A closed container for use in heat treatment consisting of a non-warping heat-resisting box composed of an alloy containing from five to thirty per cent. of chromium and from fifty to ninety per cent. of a metal classified with iron in Mendeleeff's table and of substantially the same atomic weight as iron, and a cover for said box.

4. A closed container for use in heat treatment consisting of a non-warping heat-resisting box composed of an alloy containing from five to thirty per cent. of chromium and from fifty to ninety per cent. of a metal classified with iron in Mendeleeff's table and of substantially the same atomic weight as iron, a cover, and securing means for said box, said cover and securing means being made of an alloy similar to the alloy of said box.

JOHN C. HENDERSON.